(12) United States Patent
Nagata et al.

(10) Patent No.: US 11,485,357 B2
(45) Date of Patent: Nov. 1, 2022

(54) VEHICLE CONTROL DEVICE

(71) Applicant: TOYOTA JIDOSHA KABUSHIKI KAISHA, Toyota (JP)

(72) Inventors: Shinichi Nagata, Ebina (JP); Minami Sato, Ebina (JP); Miyuki Kamatani, Susono (JP); Akitoshi Minemura, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 273 days.

(21) Appl. No.: 16/908,862

(22) Filed: Jun. 23, 2020

(65) Prior Publication Data

US 2020/0331469 A1    Oct. 22, 2020

Related U.S. Application Data

(63) Continuation of application No. 16/121,127, filed on Sep. 4, 2018, now Pat. No. 10,730,513.

(30) Foreign Application Priority Data

Sep. 28, 2017  (JP) .............................. JP2017-188402

(51) Int. Cl.
*B60W 30/00* (2006.01)
*B60W 30/09* (2012.01)

(52) U.S. Cl.
CPC ......... *B60W 30/09* (2013.01); *B60W 2554/00* (2020.02); *B60W 2710/18* (2013.01); *B60W 2710/20* (2013.01)

(58) Field of Classification Search
CPC ............. B60W 30/09; B60W 2550/10; B60W 2710/18; B60W 2710/20
(Continued)

(56) References Cited

U.S. PATENT DOCUMENTS 9,105,190 B2  8/2015  Akiyama
9,393,960 B2  7/2016  Kodaira
(Continued)

FOREIGN PATENT DOCUMENTS

CN   102673544 A   9/2012
JP   2007-083816 A   4/2007
(Continued)

OTHER PUBLICATIONS

Notice of Allowance dated Mar. 23, 2020, which issued during the prosecution of U.S. Appl. No. 16/121,127.

*Primary Examiner* — Tyler J Lee
*Assistant Examiner* — Tiffany P Ohman
(74) *Attorney, Agent, or Firm* — Sughrue Mion, PLLC

(57) ABSTRACT

A vehicle control device includes at least one electronic control unit configured to recognize at least one object, calculate a time to collision, operate first driving assistance, when the time to collision is equal to or less than a first threshold value, operate second driving assistance for avoiding the collision between the at least one object and the host vehicle or reducing damage of the collision, when the time to collision is equal to or less than a second threshold value smaller than the first threshold value, and set, while the first driving assistance is operated, the second threshold value to a second setting value smaller than a first setting value set when the first driving assistance is not operated, when a second target object causing the second driving assistance to operate is the same object as a first target object causing the first driving assistance to operate.

4 Claims, 7 Drawing Sheets

(58) Field of Classification Search
USPC .......................................................... 701/44
See application file for complete search history.

(56) References Cited

U.S. PATENT DOCUMENTS

| | | | |
|---|---|---|---|
| 9,405,727 | B2 | 8/2016 | Nagata |
| 9,483,945 | B2 | 11/2016 | Okita et al. |
| 9,669,760 | B2 | 6/2017 | Hanita et al. |
| 9,873,412 | B2 | 1/2018 | Moriizumi |
| 9,898,929 | B2 | 2/2018 | Harada et al. |
| 9,965,955 | B2 | 5/2018 | Fujishiro |
| 10,793,147 | B2 | 10/2020 | Kaminade et al. |
| 10,946,830 | B2 | 3/2021 | Sawai et al. |
| 11,175,673 | B2 | 11/2021 | Eshima |
| 2012/0239265 | A1* | 9/2012 | Kato ................. B60W 30/0953 701/70 |
| 2014/0343749 | A1 | 11/2014 | Minemura et al. |
| 2014/0379244 | A1* | 12/2014 | Haeussler ............ B60W 30/09 701/117 |
| 2015/0039218 | A1* | 2/2015 | Bowers ............. B60W 30/0956 701/301 |
| 2015/0232073 | A1 | 8/2015 | Fujishiro |
| 2016/0121886 | A1* | 5/2016 | Eigel .................... B60W 30/09 701/23 |
| 2018/0118203 | A1 | 5/2018 | Minemura et al. |
| 2019/0092320 | A1 | 3/2019 | Nagata et al. |

FOREIGN PATENT DOCUMENTS

| | | |
|---|---|---|
| JP | 2012192776 A | 10/2012 |
| JP | 5172366 B2 | 1/2013 |
| JP | 2013137710 A | 7/2013 |
| JP | 2014-222463 A | 11/2014 |
| JP | 2016-192165 A | 11/2016 |
| JP | 2017-114429 A | 6/2017 |
| WO | 2014/037998 A1 | 3/2014 |

\* cited by examiner

VEHICLE CONTROL DEVICE

INCORPORATION BY REFERENCE

This is a continuation of U.S. application Ser. No. 16/121,127 filed Sep. 4, 2018 (allowed), which claims priority to Japanese Patent Application No. 2017-188402 filed on Sep. 28, 2017. The entire disclosures of the prior applications are considered part of the disclosure of the accompanying continuation application, and are hereby incorporated by reference.

BACKGROUND

1. Technical Field

The disclosure relates to a vehicle control device including a function of assisting driving of a vehicle by a driver.

2. Description of Related Art

In a related art, a precrash safety system (hereinafter, referred to as PCS) that recognizes an object in front of a vehicle using a sensor, and avoids a collision with the object or reduces damage due to a collision is realized. Japanese Unexamined Patent Application Publication No. 2017-114429 (JP 2017-114429 A) discloses that when a predetermined collision avoidance operation is performed by a driver, the driver is determined to have an intention of avoiding a collision and an operation timing of the PCS is delayed such that the driver does not feel trouble.

SUMMARY

In order to further improve a collision avoidance performance, another application different from the PCS is studied to be mounted on a vehicle together with the PCS. The application is a system that operates at a timing earlier than the PCS operation to cause a driver to recognize danger of a collision. Hereinafter, the system is referred to as a danger avoidance system.

When the danger avoidance system is operated, there is a high possibility that the driver recognizes the danger of the collision and performs an operation to avoid the collision. At the time, the PCS operation earlier than the collision avoidance operation of the driver may cause trouble to the driver. As a countermeasure for the trouble, the delay of the operation timing of the PCS is considered when the danger avoidance system is operated as when the driver performs the collision avoidance operation in the related art.

However, an object different from the object that causes the danger avoidance system to operate is assumed to approach a host vehicle. For example, another object may jump out from a side while the danger avoidance system is operated on an object in front of a host vehicle. In such case, since the driver may not recognize the other object, a sense of security provided to the driver deteriorates when the operation timing of the PCS is delayed.

The disclosure provides a vehicle control device capable of reducing troublesome feeling of a driver by operating two types of driving assistance having different operation timings without deteriorating a sense of security provided to the driver.

An aspect of the disclosure provides a vehicle control device including at least one electronic control unit configured to recognize at least one object in front of a host vehicle using a sensor, calculate a time to collision of the at least one object with respect to the host vehicle, operate first driving assistance for avoiding danger of a collision between the at least one object and the host vehicle, when the time to collision is equal to or less than a first threshold value, operate second driving assistance for avoiding the collision between the at least one object and the host vehicle or reducing damage of the collision, when the time to collision is equal to or less than a second threshold value smaller than the first threshold value, and set, while the first driving assistance is operated, the second threshold value to a second setting value smaller than a first setting value, the first setting value being set when the first driving assistance is not operated, when a second target object causing the second driving assistance to operate is the same object as a first target object causing the first driving assistance to operate, the first target object and the second target object being among the at least one object.

In the first driving assistance and the second driving assistance, the first driving assistance having a large threshold value with respect to the time to collision is first operated in general. With the vehicle control device configured as described above, the operation timing of the second driving assistance is delayed for the same object as the object that causes the first driving assistance to operate, that is, an object with a high possibility of recognition of the danger of the collision by the driver. According to the above description, troublesome feeling of the driver for the operation of the second driving assistance following the operation of the first driving assistance is suppressed. On the other hand, the operation timing of the second driving assistance remains as a normal timing for an object different from the object that causes the first driving assistance to operate, that is, an object that the driver may not recognize the danger of the collision. According to the above description, a sense of security provided to the driver by the operation of the second driving assistance improves.

In the vehicle control device according to the aspect of the disclosure, the at least one electronic control unit may be configured to cancel the operation of the first driving assistance when a driver performs a danger avoidance operation during the operation of the first driving assistance.

The performing of the danger avoidance operation by the driver is determined that the driver recognizes the danger of the collision. According to the above description, the troublesome feeling of the driver due to a continuous operation of the first driving assistance even though the driver performs the danger avoidance operation is suppressed.

In the vehicle control device according to the aspect of the disclosure, the at least one electronic control unit may be configured to set the second threshold value to the first setting value, when the operation of the first driving assistance is canceled by the danger avoidance operation. That is, when the driver performs the danger avoidance operation to release the operation of the first piece of driving assistance, the operation timing of the second piece of driving assistance may be returned to a normal operation timing.

The operation of the first driving assistance may be canceled even though the danger avoidance operation by the driver is not sufficient. According to the above description, deterioration of the sense of security provided to the driver due to the delay of the operation timing of the second driving assistance is suppressed.

In the vehicle control device according to the aspect of the disclosure, the at least one electronic control unit may be configured to operate the first driving assistance using an application different from an application operating the second driving assistance.

In the vehicle control device according to the aspect of the disclosure, the danger avoidance operation may include at least one of an operation of a brake or a steering wheel.

In the vehicle control device according to the aspect of the disclosure, the at least one electronic control unit may be configured to set, while the first driving assistance is operated, the second threshold value to the first setting value, when the second target object is a different object from the first target object.

As described above, according to the aspects of the disclosure, the troublesome feeling of the driver can be reduced by operating the two types of driving assistance having the different operation timings without deteriorating the sense of security provided to the driver.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to drawings. However, when a number such as the numbers of respective elements, quantity, amount, or range is mentioned in the following embodiments, the disclosure is not limited to the mentioned numbers excluding a case where the numbers are particularly stated and are obviously specified in principle. Structures described in the following embodiments are not necessarily required for the disclosure excluding a case where the structures are particularly stated and are obviously specified in principle.

Embodiment 1

1-1. Configuration of Vehicle Control Device

Figure 1:
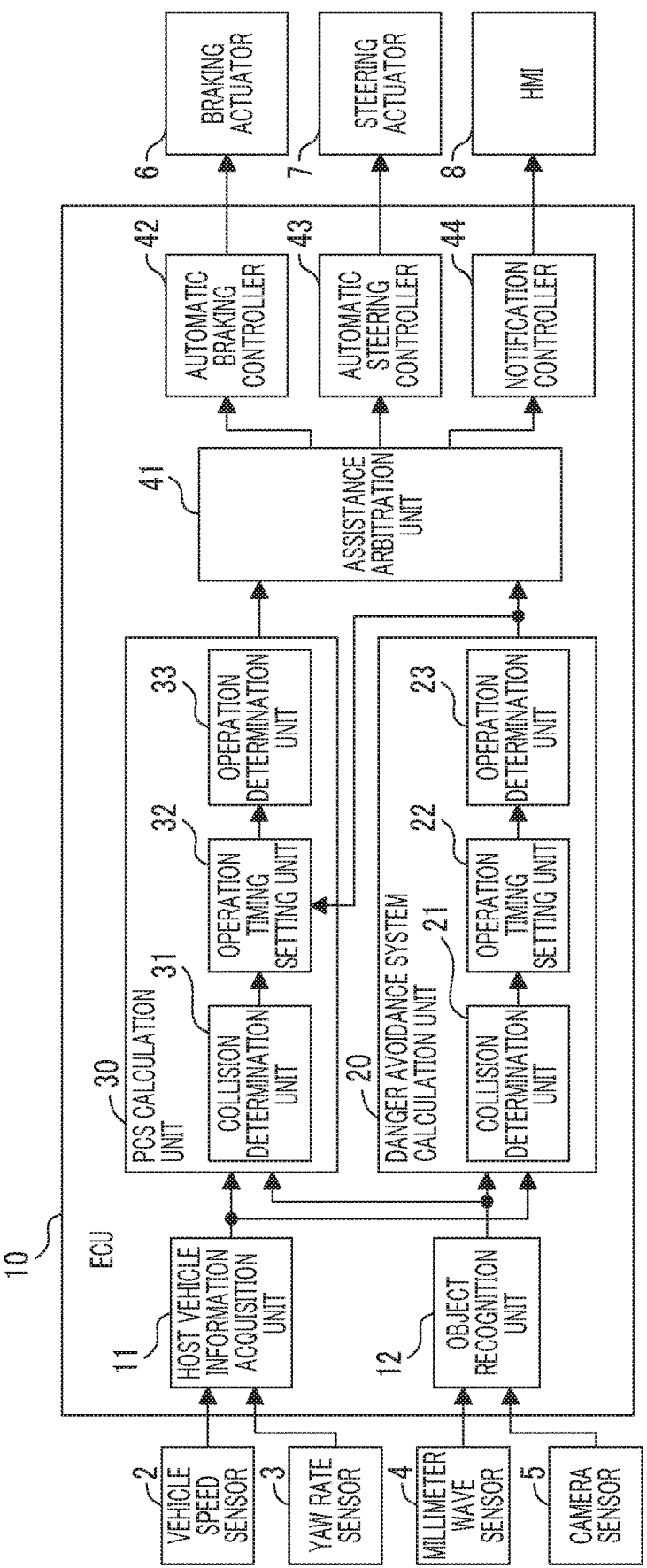
FIG. 1 is a block diagram showing a configuration of a vehicle control device according to an embodiment of the disclosure.

A vehicle control device according to an embodiment of the disclosure is a device that assists driving of a vehicle by a driver so as to detect a possibility of a collision of a host vehicle on which the device is mounted and to avoid the collision. FIG. 1 is a block diagram showing a configuration of the vehicle control device according to the embodiment of the disclosure. A configuration of the vehicle control device described here is common not only to Embodiment 1 but also to Embodiment 2 described below.

As shown in FIG. 1, a vehicle control device 10 is configured to take in signals from various sensors 2, 3, 4, and 5 attached to the vehicle, and to operate various actuators 6, 7 and a human machine interface (HMI) 8 by operation signals obtained by processing the signals. The various sensors 2, 3, 4, and 5 include vehicle sensors 2, 3 that acquire information relating to a motion state of the vehicle and autonomous recognition sensors 4, 5 that acquire pieces of information relating to a surrounding environment and a peripheral object of the vehicle. Specifically, the vehicle sensors include a vehicle speed sensor 2 that measures a traveling speed of the vehicle from rotation speeds of tire-wheel assemblies and a yaw rate sensor 3 that measures a turning angular speed of the vehicle. An acceleration sensor (not shown) is also one of the vehicle sensors. The autonomous recognition sensors include a millimeter wave sensor 4 provided, for example, in a front grille of the vehicle and a camera sensor 5 provided, for example, in a windshield of the vehicle. The camera sensor is configured as a stereo camera capable of measuring, for example, a distance to an imaging target. The sensors 2, 3, 4, and 5 described above are connected to the vehicle control device 10 directly or through a communication network such as a controller area network (CAN) constructed in the vehicle.

The various actuators 6, 7 include a braking actuator 6 for decelerating the vehicle and a steering actuator 7 for steering the vehicle. The braking actuator 6 is, for example, a hydraulic brake. However, when the vehicle is a hybrid vehicle or an electric vehicle, a power regenerative brake is also included in the braking actuator 6. The steering actuator 7 is a motor or a power steering system using hydraulic pressure. The HMI 8 is an interface for outputting and inputting of information between the driver and the vehicle control device 10. The HMI 8 includes, for example, a display for displaying image information to the driver, a speaker for outputting a sound, and a touch panel for the driver to perform an input operation.

The vehicle control device 10 is an electronic control unit (ECU) having at least one central processing unit (CPU), at least one read only memory (ROM), and at least one random access memory (RAM). Various pieces of data including various programs and maps for avoiding the collision are stored in the ROM. The vehicle control device 10 loads the programs stored in the ROM on the RAM and causes the CPU to execute the programs to realize various functions. The vehicle control device 10 may be configured to have a plurality of ECUs. In FIG. 1, functions particularly related to the collision avoidance among the functions included in the vehicle control device 10 are represented by blocks. Illustration of other functions included in the vehicle control device 10 is omitted.

When an object is present in front of the host vehicle, the vehicle control device 10 has a function of detecting the possibility of colliding with the object and of performing driving assistance for avoiding the collision. The functions described above are realized by a host vehicle information acquisition unit 11, an object recognition unit 12, a danger avoidance system calculation unit 20, a PCS calculation unit 30, an assistance arbitration unit 41, an automatic braking controller 42, an automatic steering controller 43, and a notification controller 44 included in the vehicle control device 10. However, configuration elements described above are not present as hardware in the vehicle control device 10 and are realized by software when the programs stored in the ROM are executed by the CPU.

The host vehicle information acquisition unit 11 acquires information from the vehicle sensors such as the vehicle speed sensor 2 and the yaw rate sensor 3 and calculates the motion state of the host vehicle based on the acquired information. The host vehicle information acquisition unit 11 predicts a path of the host vehicle from the motion state of the host vehicle. An actual steering angle acquired by a steering angle sensor (not shown) may be used for predicting the path of the host vehicle in addition to a vehicle speed and a yaw rate. The host vehicle information acquisition unit 11 updates a reference coordinate system constructed on a computer in accordance with the predicted path. The reference coordinate system sets a direction of the predicted path of the host vehicle as the Y-axis and sets the width direction of the host vehicle as the X-axis with a base point taken on the host vehicle as the center.

The object recognition unit 12 recognizes an object around the host vehicle. Information acquired from the autonomous recognition sensor such as the millimeter wave sensor 4 and the camera sensor 5 is used for recognizing the peripheral object. The object recognition unit 12 can recognize the peripheral object by at least one method of, for example, using information of the millimeter wave sensor 4, using information of the camera sensor 5, or using the information of the millimeter wave sensor 4 and the information of the camera sensor 5 in combination by sensor fusion. The peripheral object to be recognized includes a moving object such as a pedestrian, a two-wheeled vehicle, or an automobile, and a stationary object such as a stopped vehicle, a guardrail, a building, or a tree. The object recognition unit 12 processes a captured image obtained by the camera sensor 5 to recognize a section line such as a roadway outside line or a roadway center line. The object recognition unit 12 calculates a position coordinate of a recognized object in the reference coordinate system.

The danger avoidance system calculation unit 20 determines whether to operate a danger avoidance system. When determination is made that danger of the collision between the object in front of the host vehicle and the host vehicle occurs, the danger avoidance system operates the braking actuator 6 and the steering actuator 7 to avoid the danger of the collision. Specifically, the danger avoidance system calculation unit 20 includes a collision determination unit 21, an operation timing setting unit 22, and an operation determination unit 23. The danger avoidance system calculation unit 20 is an example of "first driving assistance unit", and the operations of the braking actuator 6 and the steering actuator 7 by the danger avoidance system calculation unit 20 are examples of "first driving assistance".

A calculation result of the host vehicle information acquisition unit 11 and a recognition result of the object recognition unit 12 are input to the collision determination unit 21. The collision determination unit 21 determines a need to operate the danger avoidance system based on a state of the host vehicle and a relative relationship between each object recognized by the object recognition unit 12 and the host vehicle. In details, the collision determination unit 21 calculates a predetermined variable for collision determination for the object recognized by the object recognition unit 12. The variable for collision determination is a parameter for determining dangerousness of the collision between the object and the host vehicle and includes, for example, a lateral position of the object. The lateral position is a position in the width direction of the object with respect to the host vehicle, that is, is an X coordinate of the object in the reference coordinate system. For example, when there is an object having a lateral position that is within a predetermined threshold value range, the collision determination unit 21 determines that there is a need to operate the danger avoidance system and approves the object as an operation target of the danger avoidance system.

The operation timing setting unit 22 sets a timing of operating the danger avoidance system based on the calculation result of the host vehicle information acquisition unit 11 and the recognition result of the object recognition unit 12. In the embodiment, the vehicle control device 10 operates the danger avoidance system when a time to collision (hereinafter, referred to as TTC) of the object approved as the operation target with respect to the host vehicle is equal to or less than a predetermined threshold value. Therefore, in the operation timing setting unit 22, the threshold value with respect to the TTC (hereinafter, referred to as TTC threshold value for danger avoidance system) is set as an operation timing of the danger avoidance system. When the X-axis of the reference coordinate system is set as a distance (lateral position) and the Y-axis thereof is set as a time (TTC), an area defined by the threshold value range of the lateral position and a TTC threshold value for danger avoidance system of the TTC is a target area where the danger avoidance system operates. The target area of the danger avoidance system will be described more specifically in "1-2. Setting of Each Target Area of Danger Avoidance System and PCS" described below.

The operation determination unit 23 determines whether to operate the danger avoidance system. Specifically, the operation determination unit 23 calculates a TTC of the object approved as the operation target of the danger avoidance system with respect to the host vehicle using pieces of information acquired from the host vehicle information acquisition unit 11 and the object recognition unit 12. In details, a distance of the object with respect to the host vehicle is divided by a relative speed to calculate the TTC. When the TTC and the TTC threshold value for danger avoidance system set by the operation timing setting unit 22 are compared with each other and the TTC is equal to or less than the TTC threshold value for danger avoidance system, the operation determination unit 23 determines to operate the danger avoidance system.

When the danger avoidance system is operated, the danger avoidance system calculation unit 20 operates any one of avoidance steering assistance and deceleration assistance according to a situation. The deceleration assistance assists an operation of the braking actuator 6 by the driver, and the avoidance steering assistance assists an operation of the steering actuator 7 by the driver. For example, when an avoidance margin width can be ensured within a traveling lane of the host vehicle, the avoidance steering assistance is operated with priority over the deceleration assistance. On the other hand, when the avoidance margin width cannot be ensured within the traveling lane of the host vehicle, the avoidance steering assistance is not operated and the deceleration assistance is operated. When the deceleration assistance is operated, a deceleration request is output from the danger avoidance system calculation unit 20 to the assistance arbitration unit 41. When the avoidance steering assistance is operated, an avoidance steering request is output from the danger avoidance system calculation unit 20 to the assistance arbitration unit 41.

The PCS calculation unit 30 determines whether to operate the PCS. The PCS is a system of automatically operating the braking actuator 6 and the steering actuator 7 to avoid the collision or to reduce the damage due to the collision when a possibility of collision between the object in front of the host vehicle and the host vehicle is determined to be high. In details, the PCS calculation unit 30 includes a collision determination unit 31, an operation timing setting unit 32, and an operation determination unit 33. The PCS calculation unit 30 is an example of "second driving assistance unit", and the operations of the braking actuator 6 and the steering actuator 7 by the PCS calculation unit 30 are examples of "second driving assistance".

A calculation result of the host vehicle information acquisition unit 11 and a recognition result of the object recognition unit 12 are input to the collision determination unit 31. The collision determination unit 31 determines a need to operate the PCS based on a state of the host vehicle and a relative relationship between each object recognized by the object recognition unit 12 and the host vehicle. In details, the collision determination unit 31 calculates a predetermined variable for collision determination, for example, a lateral position for the object recognized by the object recognition unit 12. For example, when there is an object having the lateral position that is within a predetermined threshold value range, the collision determination unit 31 determines that there is a need to operate the PCS and approves the object as an operation target of the PCS. There is no particular limitation, but the threshold value range of the lateral position for determining the need to operate the PCS is preferably the same as or narrower than the threshold value range of the lateral position for determining the need to operate the danger avoidance system.

The operation timing setting unit 32 sets a timing of operating the PCS based on the calculation result of the host vehicle information acquisition unit 11 and the recognition result of the object recognition unit 12 based on an operation situation of the danger avoidance system. In the embodiment, the vehicle control device 10 operates the PCS when a TTC of the object approved as the operation target with respect to the host vehicle is equal to or less than a predetermined threshold value. Therefore, in the operation timing setting unit 32, the threshold value with respect to the TTC (hereinafter, referred to as TTC threshold value for PCS) is set as an operation timing of the PCS. When the X-axis of the reference coordinate system is set as a distance (lateral position) and the Y-axis thereof is set as a time (TTC), an area defined by the threshold value range of the lateral position and a TTC threshold value for PCS is a target area where the PCS operates. The target area of the PCS will be described more specifically in "1-2. Setting of Each Target Area of Danger Avoidance System and PCS" described below.

Since the PCS is operated when the collision cannot be avoided even though the danger avoidance system is operated, the TTC threshold value for PCS configured to determine the operation timing of the PCS is set to a value which is smaller than the TTC threshold value for danger avoidance system configured to determine the operation timing of the danger avoidance system. Specifically, the TTC threshold value for danger avoidance system is set to five seconds, and the TTC threshold value for PCS is set to three seconds. However, the TTC threshold value for PCS is not a fixed value and is a variable value having a setting value that is changed according to the operation situation of the danger avoidance system. The setting of the TTC threshold value for PCS will be described in details in "1-2. Setting of Each Target Area of Danger Avoidance System and PCS" described below. The TTC threshold value for danger avoidance system is an example of "first threshold value", and the TTC threshold value for PCS is an example of "second threshold value".

The operation determination unit 33 determines whether to operate the PCS. Specifically, the operation determination unit 33 calculates a TTC of the object approved as the operation target of the PCS with respect to the host vehicle using pieces of information acquired from the host vehicle information acquisition unit 11 and the object recognition unit 12. When the TTC and the TTC threshold value for PCS set by the operation timing setting unit 32 are compared with each other and the TTC is within the TTC threshold value for PCS, the operation determination unit 33 determines to operate the PCS.

When the PCS is operated, PCS calculation unit 30 operates an alarm, the deceleration assistance, and intervention braking. The deceleration assistance assists the operation of the braking actuator 6 by the driver, and the intervention braking automatically operates the braking actuator 6 to forcibly apply braking force. The deceleration assistance by the PCS is adjusted such that deceleration larger than the deceleration assistance by the danger avoidance system acts on the vehicle. The PCS calculation unit 30 first operates the alarm, then operates the deceleration assistance, and finally operates the intervention braking. When the alarm is operated, an alarm request is output from the PCS calculation unit 30 to the assistance arbitration unit 41. When the deceleration assistance or the intervention braking is operated, the deceleration request is output from the PCS calculation unit 30 to the assistance arbitration unit 41. When the avoidance margin width can be ensured within a traveling lane of the host vehicle, the avoidance steering assistance may be operated together with the deceleration assistance (or intervention braking). When the avoidance steering assistance is operated, the avoidance steering request is output from the PCS calculation unit 30 to the assistance arbitration unit 41.

The assistance arbitration unit 41 arbitrates the requests from the danger avoidance system calculation unit 20, the requests from the PCS calculation unit 30, and requests from another control system, and provides the arbitrated requests to the automatic braking controller 42, the automatic steering controller 43, and the notification controller 44. For example, the deceleration request provided to the automatic braking controller 42 may be simultaneously output from the danger avoidance system calculation unit 20 and the PCS calculation unit 30. Furthermore, the deceleration request may be output also from an adaptive cruise control system. The avoidance steering request provided to the automatic steering controller 43 may be also simultaneously output from the danger avoidance system calculation unit 20 and the PCS calculation unit 30. Furthermore, the deceleration request may be output also from a lane trace control system.

When the requests are simultaneously provided from a plurality of systems described above, an arbitration process determines a request to be realized according to a priority. The same employs in the alarm requests provided to the notification controller 44. When there is a plurality of alarm requests, an alarm to be prioritized is determined by the arbitration process. In an example of the priority, when there are the deceleration request from the danger avoidance system calculation unit 20 and the deceleration request from the PCS calculation unit 30, the deceleration request from the PCS calculation unit 30 is prioritized. The same also employs in the avoidance steering request. The avoidance steering request from the PCS calculation unit 30 is prioritized.

The automatic braking controller 42 is a driver configured to control the braking actuator 6. The automatic steering controller 43 is a driver configured to control the steering actuator 7. The notification controller 44 is a driver configured to control the HMI 8. The automatic braking controller 42, the automatic steering controller 43, and the notification controller 44 respectively operate the braking actuator 6, the steering actuator 7, and the HMI 8 according to the requests arbitrated by the assistance arbitration unit 41.

1-2. Setting of Each Target Area of Danger Avoidance System and PCS

Figure 2:
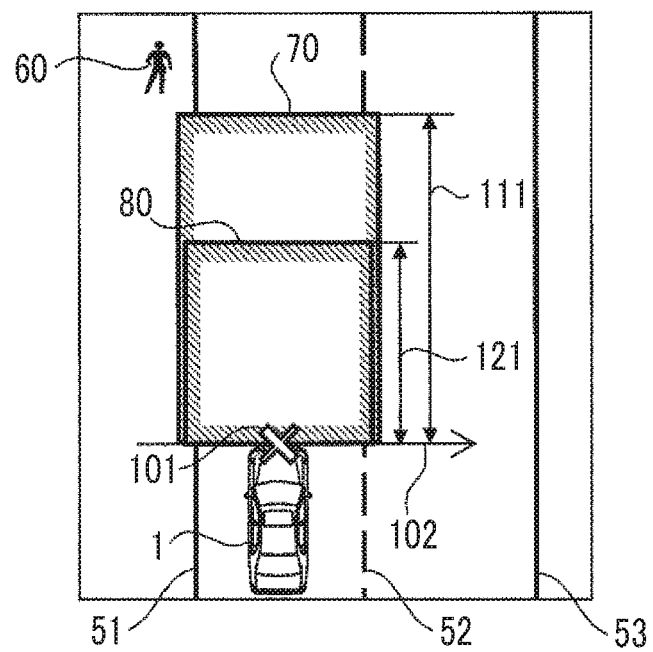
FIG. 2 is a diagram for describing a setting of each target area of a danger avoidance system and a PCS.

A setting of each target area of the danger avoidance system and the PCS will be described with reference to FIG. 2. A host vehicle 1 and a pedestrian 60 which is the moving object are drawn in FIG. 2. The right and left roadway outside lines 53, 51 are drawn by solid lines, and a roadway center line 52 is drawn by dotted lines. Furthermore, a target area 70 of the danger avoidance system and a target area 80 of the PCS are respectively drawn. FIG. 2 shows a positional relationship between the host vehicle 1 and the target areas 70, 80 in the reference coordinate system. Here, an object recognized by the object recognition unit 12 is assumed to be solely the pedestrian 60. The pedestrian 60 is schematically drawn in FIG. 2. However, in an actual recognition process by the object recognition unit 12, all objects including the pedestrian 60 are represented in rectangular shapes in the reference coordinate system and are recognized as target objects having size and movement vector.

The target area 70 of the danger avoidance system is an area where the danger avoidance system is operated when an object is positioned inside the area 70. The target area 70 is set in front of the host vehicle 1 compared with an X-axis 102 of the reference coordinate system with a base point 101 taken at the center of the front end of the host vehicle 1 as the reference. However, "in front of" here means the future viewed from the present time. That is, a dimension of the Y-axis (not shown) when the TTC is handled in the reference coordinate system is time, and the time on the X-axis 102 is zero. A front distance of the target area 70 corresponds to a TTC threshold value for danger avoidance system 111. A width of the target area 70 in an X-axis direction corresponds to the threshold value range of the lateral position for determining the need to operate the danger avoidance system.

The target area 80 of the PCS is an area where the PCS is operated when an object is positioned inside the area 80. The target area 80 is set in front of the host vehicle 1 compared with an X-axis 102 of the reference coordinate system with the base point 101 taken at the center of the front end of the host vehicle 1 as the reference. A front distance of the target area 80 corresponds to a TTC threshold value for PCS 121. Therefore, the front distance of the target area 80 is shorter than the front distance of the target area 70. A width of the target area 80 in the X-axis direction corresponds to the threshold value range of the lateral position for determining the need to operate the PCS. There is no particular limitation, but the width of the target area 80 in the X-axis direction is preferably the same as or narrower than the width of the target area 70 in X-axis direction.

Figure 3:
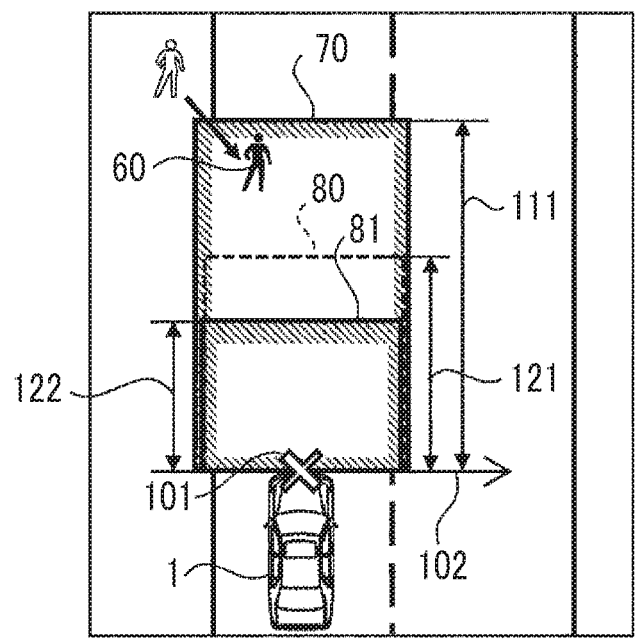
FIG. 3 is a diagram for describing a process executed when an object enters the target area of the danger avoidance system.

FIG. 3 is a diagram for describing a process executed when the pedestrian 60 enters the target area 70 of the danger avoidance system. In a case where the lateral position of the pedestrian 60 is within the threshold value range, when the TTC is equal to or less than the TTC threshold value for danger avoidance system 111, the pedestrian 60 is in the target area 70. When the pedestrian 60 enters the target area 70, the vehicle control device 10 operates the danger avoidance system with the pedestrian 60 as the target. Simultaneously, the vehicle control device 10 decreases the TTC threshold value for PCS from the value 121 to a value 122 and reduces the target area of the PCS from the area 80 to an area 81. A process of changing the TTC threshold value for PCS is performed by the operation timing setting unit 32 of the PCS calculation unit 30.

Figure 4:
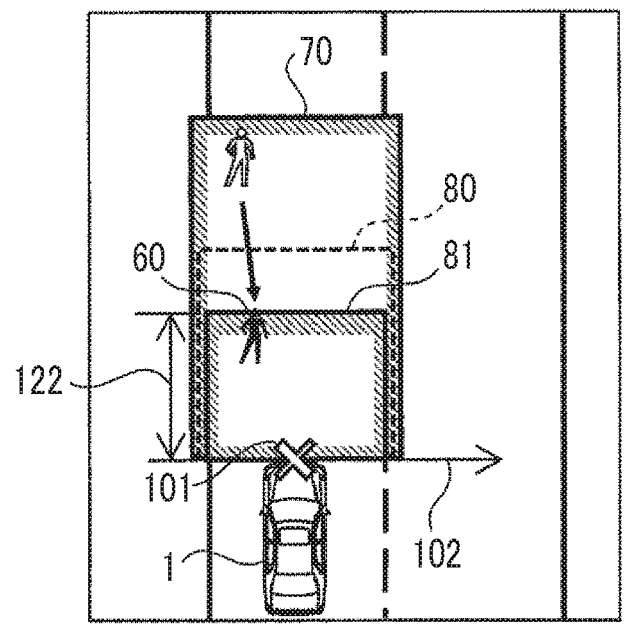
FIG. 4 is a diagram for describing a process executed when the object that enters the target area of the danger avoidance system further enters the target area of the PCS.

FIG. 4 is a diagram for describing a process executed when the pedestrian 60 who enters the target area 70 of the danger avoidance system further enters the target area (target area after reduction) 81 of the PCS. In a case where the lateral position of the pedestrian 60 is within the threshold value range, when the TTC is equal to or less than the TTC threshold value for PCS 122, the pedestrian 60 is in the target area 81. When the pedestrian 60 enters the target area 81, the vehicle control device 10 operates the PCS with the pedestrian 60 as the target.

The processes described in FIGS. 3 and 4 are processes when the object that causes the danger avoidance system to operate and the target that causes the PCS to operate are the same object (the same pedestrian 60). In the case, the TTC threshold value for PCS is set to a value which is smaller than a value when the danger avoidance system is not operated, and the target area that causes the PCS to operate is reduced. According to the above description, since the operation timing of the PCS is delayed for an object with a high possibility of recognition of the danger of the collision by the driver, troublesome feeling of the driver for the operation of the PCS following the operation of the danger avoidance system is suppressed.

Figure 5:
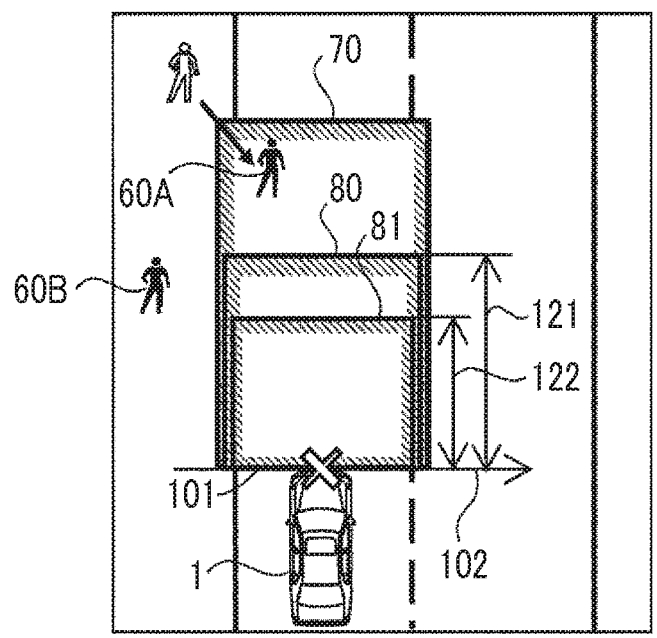
FIG. 5 is a diagram for describing a process executed when one object enters the target area of the danger avoidance system in a case where a plurality of objects is recognized.

On the other hand, when there is a plurality of objects recognized by the object recognition unit 12, a process different from the above processes may be performed. FIG. 5 is a diagram for describing a process executed when one object enters the target area 70 of the danger avoidance system in the case where a plurality of objects is recognized. Two pedestrians 60A, 60B recognized by the object recognition unit 12 are drawn in FIG. 5. Here, solely the pedestrian 60A is assumed to enter the target area 70 of the danger avoidance system. In the case, the vehicle control device 10 decreases the TTC threshold value for PCS from the value 121 to the value 122 and reduces the target area of the PCS from the area 80 to the area 81 simultaneously operating the danger avoidance system with the pedestrian 60A as the target.

However, the TTC threshold value for PCS is decreased solely for the pedestrian 60A. The operation timing setting unit 32 of the PCS calculation unit 30 sets the TTC threshold value for PCS for each object recognized by the object recognition unit 12. The operation timing setting unit 32 maintains the TTC threshold value for PCS at a normal setting value 121 and maintains the target area of the PCS at a normal setting area 80 for the pedestrian 60B who does not enter the target area 70 of the danger avoidance system. That is, the operation timing of the PCS is delayed solely for the object (pedestrian 60A) that causes the danger avoidance system to operate and remains as the normal timing for the object (pedestrian 60B) different from the object (pedestrian 60A) that causes the danger avoidance system to operate.

Figure 6:
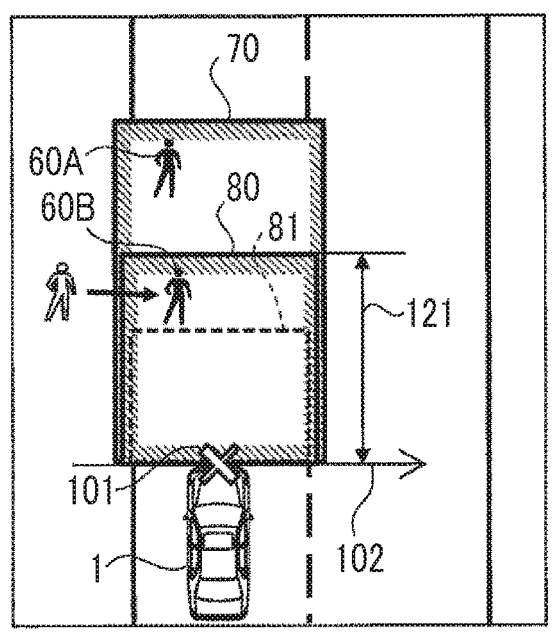
FIG. 6 is a diagram for describing a process executed when an object different from the object that enters the target area of the danger avoidance system enters the target area of the PCS.

FIG. 6 is a diagram for describing a process executed when the pedestrian 60B different from the pedestrian 60A who enters the target area 70 of the danger avoidance system enters the target area 80 of the PCS. When a lateral position of the pedestrian 60B is within the threshold value range and a TTC of the pedestrian 60B is equal to or less than the TTC threshold value for PCS 121, the pedestrian 60B is in the target area 80. When the pedestrian 60B enters the target area 80, the vehicle control device 10 operates the PCS with the pedestrian 60B as the target.

If the target area of the PCS for the pedestrian 60B is reduced from the area 80 to the area 81, the PCS does not operate since the pedestrian 60B is not in the area 81 in the example shown in FIG. 6. For the pedestrian 60A who is the operation target of the danger avoidance system, there is a high possibility that the driver recognizes the presence of the pedestrian 60A, but the driver may not recognize the pedestrian 60B who jumps out from a side. Consequently, when the operation timing of the PCS is delayed, a sense of security provided to the driver deteriorates. In the point, in the embodiment, since the operation timing of the PCS remains as the normal timing for the object (pedestrian 60B) that the driver may not recognize the danger of the collision, the sense of security provided to the driver by the operation of the PCS improves.

1-3. Driving Assistance Control for Avoiding Collision

Figure 7:
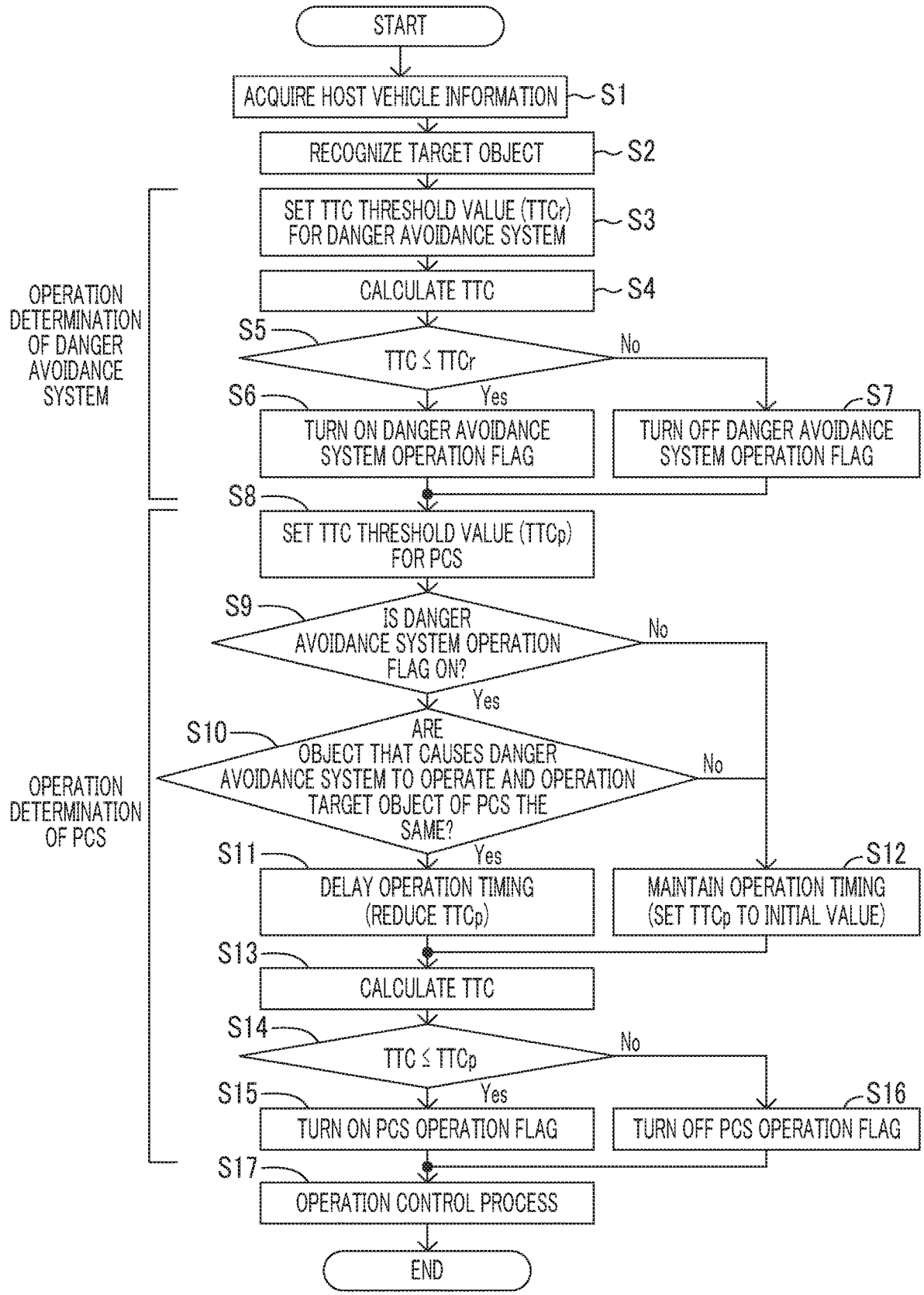
FIG. 7 is a flowchart showing a flow of driving assistance control for avoiding a collision according to Embodiment 1.

The vehicle control device 10 configured as described above executes driving assistance control for avoiding the collision while the driver drives the host vehicle 1. FIG. 7 is a flowchart showing a flow of the driving assistance control for avoiding the collision according to Embodiment 1. The vehicle control device 10 repeatedly executes processes shown in the flowchart in a predetermined period.

A process in step S1 corresponds to the function of the host vehicle information acquisition unit 11. In step S1, the motion state of the host vehicle is calculated based on the information from the vehicle sensors such as the vehicle speed sensor 2 and the yaw rate sensor 3, and the path of the host vehicle is predicted from the motion state of the host vehicle.

A process in step S2 corresponds to the function of the object recognition unit 12. In step S2, pieces of surrounding environment information are recognized using the information acquired from the autonomous recognition sensor such as the millimeter wave sensor 4 and the camera sensor 5, and further a target object is recognized from the pieces of surrounding environment information. In the process in step S2, a type of a target object (automobile, pedestrian, two-wheeled vehicle, stationary object, or the like) and a position coordinate of the target object in the reference coordinate system are recognized.

Processes from steps S3 to S7 correspond to the function of the danger avoidance system calculation unit 20. In step S3, a TTC threshold value for danger avoidance system (TTCr) is set. The TTC threshold value for danger avoidance system is basically a fixed value, but the value may be changed according to a state of the host vehicle.

In step S4, a TTC of an object that is the operation target of the danger avoidance system is calculated. When there is a plurality of objects that are the operation targets of the danger avoidance system, the TTC is calculated for each object. In step S5, determination on whether the TTC calculated in step S4 is equal to or less than the TTCr is made. When there is a plurality of objects that are the operation targets of the danger avoidance system, the determination in step S5 is also made for each object.

When the TTC (at least one TTC when TTC is calculated for each of the objects) calculated in step S4 is equal to or less than the TTCr, a process in step S6 is selected. In step S6, a flag (hereinafter, referred to as danger avoidance system operation flag) for operating the danger avoidance system is turned on. When the process in step S6 is also selected at the previous timing, the danger avoidance system operation flag is maintained to be on.

On the other hand, when the TTC (all TTCs when TTC is calculated for each of the objects) calculated in step S4 is larger than the TTCr, a process in step S7 is selected. In step S7, the danger avoidance system operation flag is turned off. When the process in step S7 is also selected at the previous timing, the danger avoidance system operation flag is maintained to be off.

Processes from step S8 to step S16 correspond to the function of the PCS calculation unit 30. In step S8, an initial value of a TTC threshold value for PCS (TTCp) is set. The initial value of the TTC threshold value for PCS is basically a fixed value, but the value may be changed according to a state of the host vehicle.

In step S9, determination on whether the danger avoidance system operation flag is on is made. When the danger avoidance system operation flag is not on, a process in step S12 is selected. In step S12, the operation timing of the PCS is maintained at the initial value by maintaining the TTC threshold value for PCS at the initial value set in step S8.

When the danger avoidance system operation flag is on, in step S10, determination on whether the object that causes the danger avoidance system to operate and an object that is the operation target of the PCS are the same is made. That is, determination on whether the object that satisfies the condition in step S5 and the object that is the operation target of the PCS are the same is made.

When the object that causes the danger avoidance system to operate and the object that is the operation target of the PCS are the same, a process in step S11 is selected. In step S11, a TTC threshold value for PCS for the object that is the operation target is smaller than the initial value set in step S8. According to the above description, the operation timing of the PCS for the object that is the operation target is delayed compared with the initial value.

On the other hand, when the object that causes the danger avoidance system to operate and the object that is the operation target of the PCS are different from each other, a process in step S12 is selected. In step S12, a TTC threshold value for PCS for the object that is the operation target is maintained at the initial value set in step S8. According to the above description, the operation timing of the PCS for the object that is the operation target is maintained at the initial value.

In step S13, a TTC of the object that is the operation target of the PCS is calculated. When there is a plurality of objects that are the operation targets of the PCS, the TTC is calculated for each object. In step S14, determination on whether the TTC calculated in step S13 is equal to or less than a TTCp is made. The TTCp used for the determination is the initial value set in step S8 when the process in step S12 is selected, and is a reduced value compared with the initial value when the process in step S11 is selected. When there is a plurality of objects that are the operation targets of the PCS, the determination in step S14 is also made for each object.

When the TTC (at least one TTC when TTC is calculated for each of the objects) calculated in step S13 is equal to or less than the TTCp, a process in step S15 is selected. In step S15, a flag (hereinafter, referred to as PCS operation flag) for operating the PCS is turned on. When the process in step S15 is also selected at the previous timing, the PCS operation flag is maintained to be on.

On the other hand, when the TTC (all TTCs when TTC is calculated for each of the objects) calculated in step S13 is larger than the TTCp, a process in step S16 is selected. In step S16, the PCS operation flag is turned off. When the process in step S16 is also selected at the previous timing, the PCS operation flag is maintained to be off.

A process in step S17 corresponds to the functions of the assistance arbitration unit 41, the automatic braking controller 42, the automatic steering controller 43, and the notification controller 44. In step S17, the braking actuator 6, the steering actuator 7, and the HMI 8 are controlled based on the danger avoidance system operation flag set in step S6 or S7 and the PCS operation flag set in step S11 or S12. Specifically, when the danger avoidance system operation flag is on, the braking actuator 6 and the like are controlled so as to operate the danger avoidance system or to maintain the operation of the danger avoidance system. When the PCS operation flag is on, the braking actuator 6 and the like are controlled so as to operate the PCS or to maintain the operation of the PCS. However, when both the danger avoidance system operation flag and the PCS operation flag are on, the PCS operation flag is prioritized.

Embodiment 2

2-1. Characteristics of Embodiment 2

Figure 8:
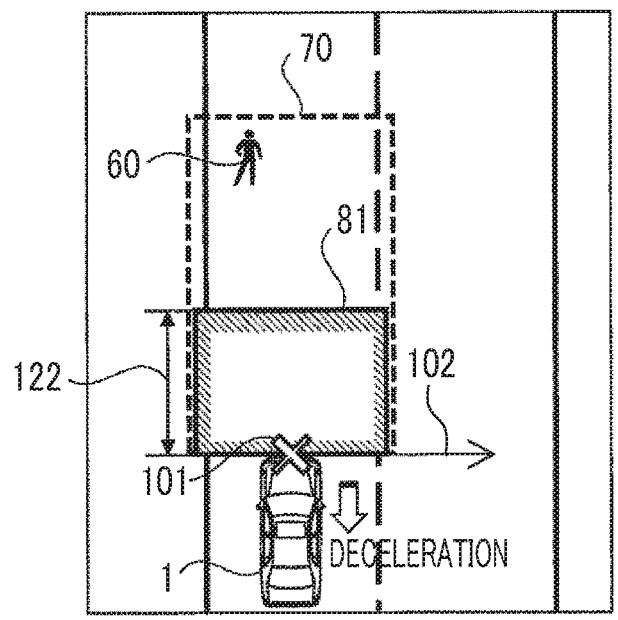
FIG. 8 is a diagram for describing a process executed when a driver performs a danger avoidance operation after the object enters the target area of the danger avoidance system.
Figure 9:
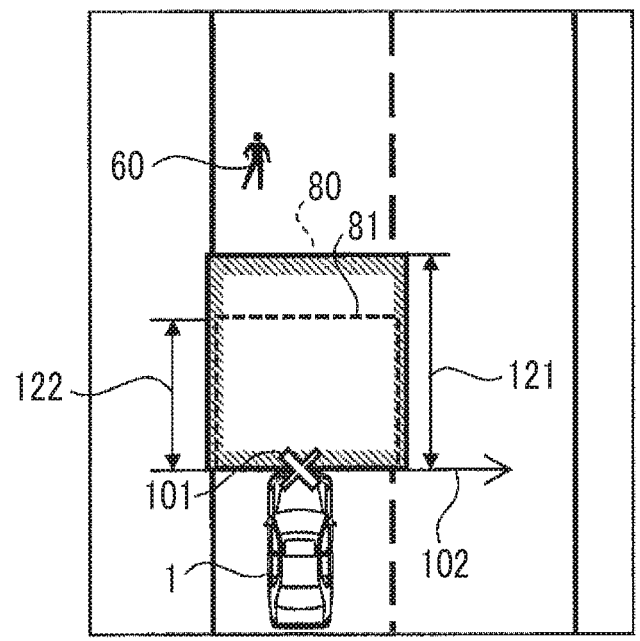
FIG. 9 is a diagram for describing a process executed when the driver performs the danger avoidance operation after the object enters the target area of the danger avoidance system.

Embodiment 2 is characterized by processes when the driver performs a danger avoidance operation during the operation of the danger avoidance system. Hereinafter, the characteristics will be described with reference to FIGS. 8 and 9. FIGS. 8 and 9 are diagrams for describing the processes when the driver performs the danger avoidance operation after the pedestrian 60 enters the target area 70 of the danger avoidance system.

When the pedestrian 60 enters the target area 70 of the danger avoidance system, the danger avoidance system calculation unit 20 operates the danger avoidance system. When the danger avoidance system operation flag is turned on, PCS calculation unit 30 decreases the TTC threshold value for PCS from the initial value to the value 122 and reduces the target area of the PCS from the normal setting area to the area 81. When the driver performs the danger avoidance operation in the reduced state, the danger avoidance system calculation unit 20 cancels the operation of the danger avoidance system as shown in FIG. 8. The reason is that the performing of the danger avoidance operation by the driver is determined that the driver recognizes the danger of the collision. The releasing of the operation of the danger avoidance system suppresses troublesome feeling of the driver due to a continuous operation of the danger avoidance system even though the driver operates the danger avoidance operation.

When the cancel of the operation of the danger avoidance system is received, the PCS calculation unit 30 resets the TTC threshold value for PCS from the value 122 to the initial value 121 and returns the target area of the PCS from the area 81 to the normal setting area 80 as shown in FIG. 9. That is, the operation timing of the PCS is returned to a normal operation timing. The reason is that the operation of the danger avoidance system may be canceled even though the danger avoidance operation by the driver is not sufficient. The returning of the operation timing of the PCS to the normal operation timing suppresses deterioration of the sense of security provided to the driver due to the delay of the operation timing of the PCS.

2-2. Driving Assistance Control for Avoiding Collision

Figure 10:
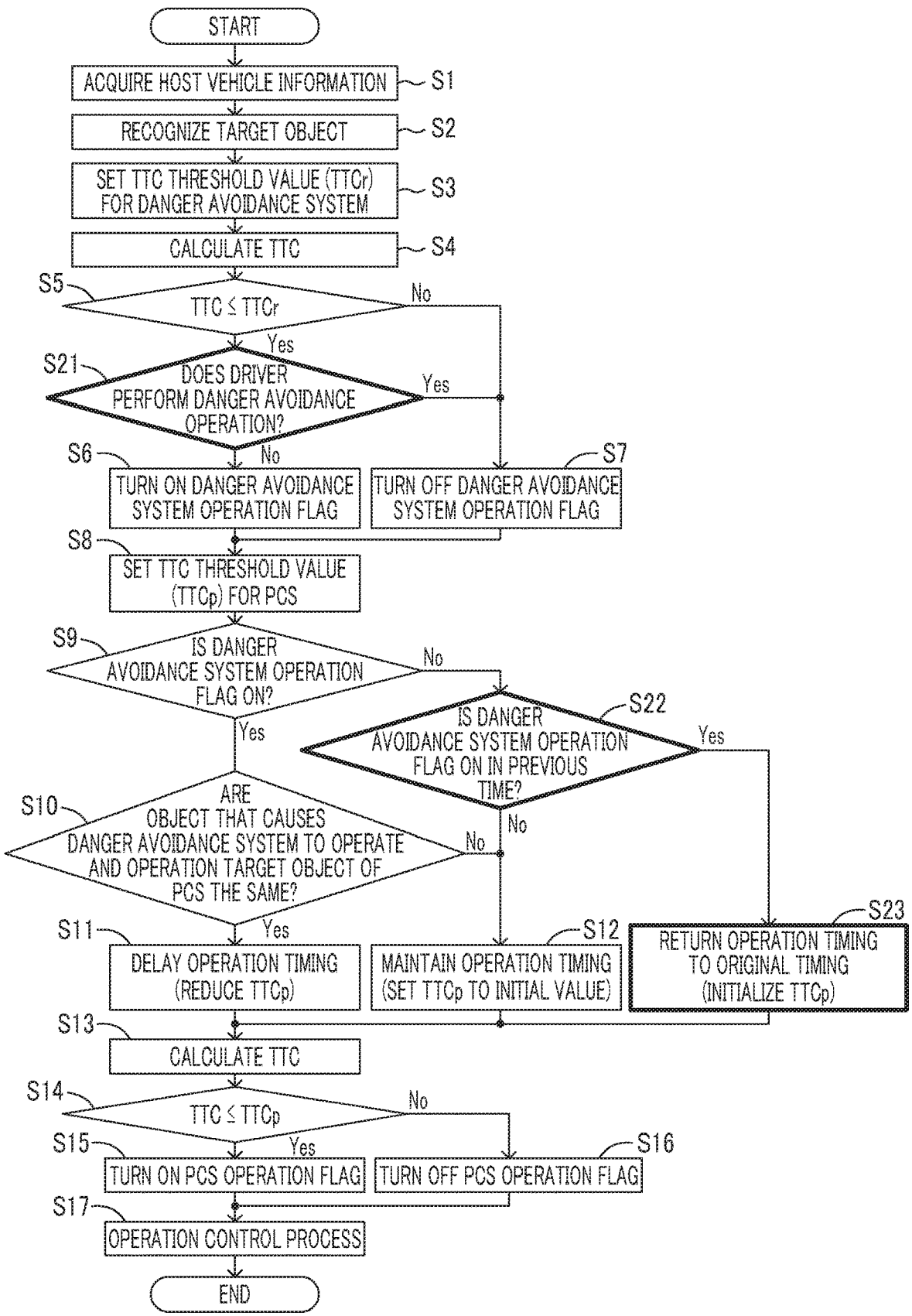
FIG. 10 is a flowchart showing a flow of driving assistance control for avoiding a collision according to Embodiment 2.

FIG. 10 is a flowchart showing a flow of driving assistance control for avoiding a collision according to Embodiment 2. The vehicle control device 10 repeatedly executes processes shown in the flowchart of FIG. 10 in a predetermined period. A common step number is assigned to a process having contents common to the driving assistance control according to Embodiment 1 in the flowchart, and a description thereof will be omitted.

In Embodiment 2, when the condition in step S5 is satisfied, determination on whether the driver performs the danger avoidance operation is made in step S21. The danger avoidance operation includes a deceleration operation of a brake and avoidance steering of a steering wheel. When the driver does not perform the danger avoidance operation, the process in step S6 is selected and the danger avoidance system operation flag is turned on or maintained to be on. On the other hand, when the driver performs the danger avoidance operation, the process in step S7 is selected and the danger avoidance system operation flag is turned off.

In Embodiment 2, when the condition in step S9 is not satisfied, that is, when the danger avoidance system operation flag is off, determination in step S22 is made. In step S22, the determination on whether the danger avoidance system operation flag is on in the previous time is made, that is, the determination on whether the danger avoidance system operation flag is switched from on to off from the previous time to the present time is made. When the danger avoidance system operation flag is also off in the previous time, the process in step S12 is selected and the operation timing of the PCS is maintained at the initial value that is the normal setting. On the other hand, when the danger avoidance system operation flag is on in the previous time, a process in step S23 is selected and the operation timing of the PCS is returned to the normal setting by resetting the TTC threshold value for danger avoidance system (TTCp) to the initial value. When the process in step S12 or step S23 is selected, determination is made using the TTCp set to the initial value in step S14.

Another Embodiment

In Embodiments 1 and 2, when the TTC is equal to or less than the TTC threshold value for danger avoidance system (TTCp), the alarm, the deceleration assistance, and the intervention braking are operated in the order. However, a TTC threshold value may be provided for each of the alarm, the deceleration assistance, and the intervention braking, and the operation determination may be made individually. Specifically, the alarm may be operated when the TTC is equal to or less than a TTC threshold value for alarm (TTCp–alm), the deceleration assistance may be operated when the TTC is equal to or less than a TTC threshold value (TTCp–pba) for deceleration assistance, and the intervention braking may be operated when the TTC is equal to or less than a TTC threshold value (TTCp–pb) for intervention braking. However, there is a relationship that $TTCr \geq TTCp-alm \geq TTCp-pba \geq TTCp-pb$ between respective threshold values.

What is claimed is:

1. A vehicle control device, comprising:
at least one electronic control unit programmed to:
recognize at least one object in front of a host vehicle using a sensor;
calculate a time to collision of the at least one object with respect to the host vehicle;
operate first driving assistance for avoiding danger of a collision between the at least one object and the host vehicle, when the time to collision is equal to or less than a first threshold value, wherein the first driving assistance includes: (i) operating a braking actuator to cause deceleration of the host vehicle and (ii) operating a steering actuator to cause the vehicle to obtain an avoidance margin width distance from the at least one vehicle;
operate second driving assistance for avoiding the collision between the at least one object and the host vehicle or reducing damage of the collision, when the time to collision is equal to or less than a second threshold value smaller than the first threshold value; and
while the first driving assistance is operated, set the second threshold value to a second setting value smaller than a first setting value, the first setting value being set when the first driving assistance is not operated, when a second target object causing the second driving assistance to operate is the same object as a first target object causing the first driving assistance to operate, the first target object and the second target object being among the at least one object, wherein
the at least one electronic control unit is further programmed to, while the first driving assistance is operated, set the second threshold value to the first setting value, when the second target object is a different object from the first target object.

2. The vehicle control device according to claim 1, wherein the at least one electronic control unit is further programmed to:
cancel the operation of the first driving assistance when a driver performs a danger avoidance operation during the operation of the first driving assistance, and
set the second threshold value to the first setting value, when the operation of the first driving assistance is canceled by the danger avoidance operation.

3. The vehicle control device according to claim 1, wherein the at least one electronic control unit is further programmed to operate the first driving assistance using a first application different from a second application operating the second driving assistance.

4. The vehicle control device according to claim 2, wherein the danger avoidance operation performed by the driver includes at least one of an operation of a brake or a steering wheel.

* * * * *